United States Patent [19]

Jatczak

[11] 4,427,241
[45] Jan. 24, 1984

[54] COMPOSITE BEARING RACES AND PROCESS FOR PRODUCING THE SAME

[75] Inventor: Chester F. Jatczak, Canton, Ohio

[73] Assignee: The Timken Company, Canton, Ohio

[21] Appl. No.: 340,264

[22] Filed: Jan. 18, 1982

[51] Int. Cl.³ .................... F16C 33/00; F16C 33/58
[52] U.S. Cl. ............................ 308/207 R; 308/211; 308/214; 308/216
[58] Field of Search ............ 308/216, 213, 214, 211, 308/207 R, 195, 196, 191, 189 R, 235, 202

[56] References Cited

U.S. PATENT DOCUMENTS

| 755,992 | 3/1904 | Bower | 308/211 |
|---|---|---|---|
| 794,154 | 7/1905 | Alsup | 308/216 |
| 1,247,859 | 11/1917 | Miller et al. | 308/214 |
| 1,672,012 | 6/1928 | Tyson | 308/216 |
| 1,830,493 | 11/1931 | Tyson | 308/216 X |
| 2,376,779 | 5/1945 | Kendall | 29/148.4 |
| 2,969,263 | 1/1961 | Lamson et al. | 308/216 X |

FOREIGN PATENT DOCUMENTS 2033975 9/1979 United Kingdom .

*Primary Examiner*—Stuart S. Levy
*Assistant Examiner*—Thomas R. Hannon
*Attorney, Agent, or Firm*—Gravely, Lieder & Woodruff

[57] ABSTRACT

The races of tapered roller bearing, that is the cone and cup of such a bearing, are composite in construction, each including a sheet metal shell form and a core that is cast within the shell form for rigidifying it. Each shell form has spaced apart walls, one of which is tapered and forms a raceway and the other of which is cylindrical. In addition each shell form has an end wall at which the two spaced apart walls are joined. The walls define a cavity that opens out of the shell form at the end opposite from the end wall. The core is within the cavity where it is bonded to the sheet metal walls. While the metal of the shell form may be high alloy vacuum melt steel, the metal of the core may be less expensive. In the production of the races, the shell form serves as a mold for holding the molten core metal as that metal cools and solidifies.

9 Claims, 7 Drawing Figures

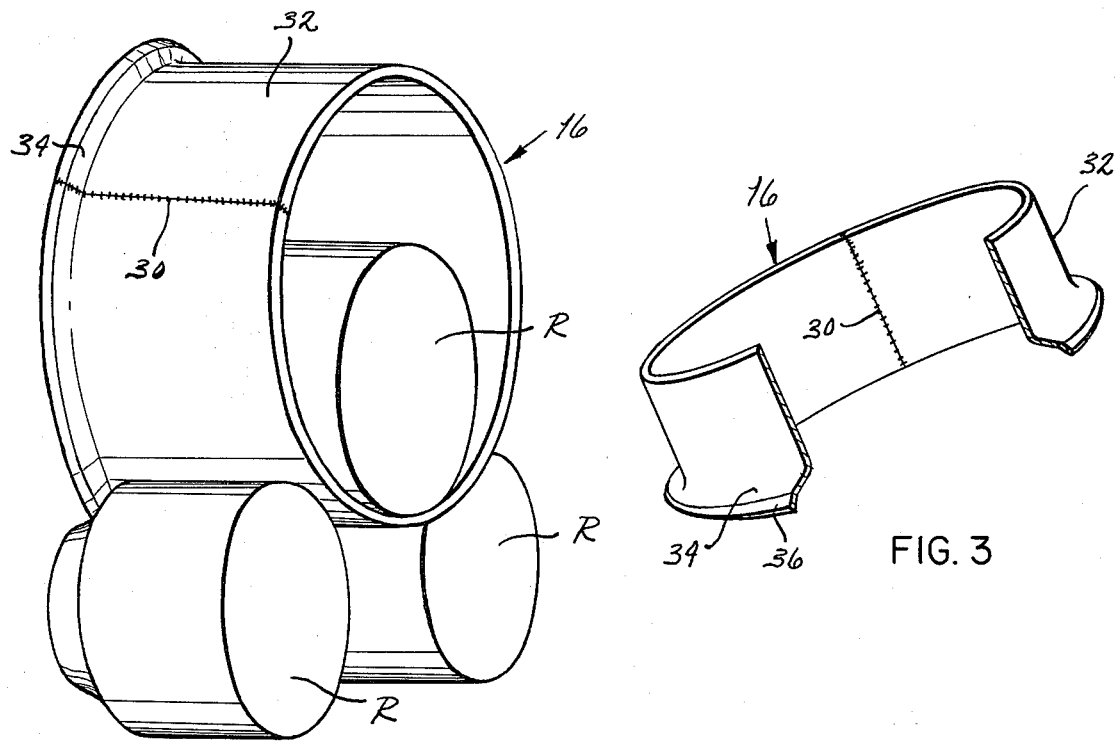
FIG. 7
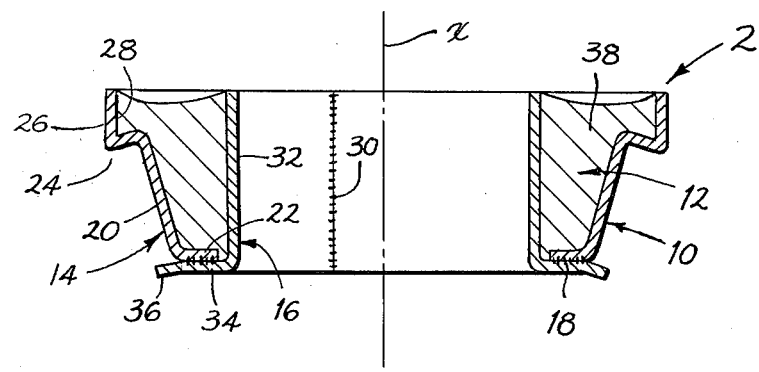
FIG. 3
FIG. 4
FIG. 5

COMPOSITE BEARING RACES AND PROCESS FOR PRODUCING THE SAME

BACKGROUND OF THE INVENTION

This invention relates in general to antifriction bearings and, more particularly, to composite races for antifriction bearings and a process for manufacturing those races.

The races of a typical antifriction bearing are wrought steel throughout, and are derived from intermediate products such as high quality alloy steel tubes and bars which are quite expensive in their own right due to special processing used to produce them and the presence of scarce alloying components, such as nickel, chromium, and molybdenum, in them. The intermediate products are obtained only after a complex and expensive processing under special conditions of cleanliness. That processing basically involves producing a high alloy melt in an electric furnace, casting the melt into ingots, reheating, rolling into blooms, reheating, rolling into billets, then forging the billets or piercing them, and finally annealing.

A multitude of machining and heat treating processes are employed to convert the tubes or bars into bearing races, and these processes also add significantly to the cost of the bearing. This is particularly true in the case of tapered roller bearings which have flanged inner races (cones) and outer races (cups) that are somewhat more complex in terms of configuration than their counterparts in other types of antifriction bearings.

Two processes are currently employed to convert tubes or bars into the cups and cones for tapered roller bearings, at least on a large scale commercial basis. The first, which has probably experienced the greatest use, involves machining a section derived from a tube or a forging derived from a bar or tube to the size and shape desired for the race, then carburizing the machined configuration to case harden the steel if desired, next heat treating to provide the steel with the desired mechanical properties, and finally finish grinding to give the races their final form and size. In this procedure, large amounts of expensive alloy steel are lost as chips during the machining. Also, considerable energy is expended in the hot tube and bar-forming operations, as well as in the heat treatments and carburizing. The second process involves cold or hot forging cut steel bar slugs to a tubular shape corresponding generally to the desired shape of the race, then rough machining, next case carburizing, then heat treating, and finally finish grinding. While this process produces fewer chips, it still consumes a considerable amount of energy during forming and in the various heat treatments and grinds, and furthermore requires expensive forming dies.

SUMMARY OF THE INVENTION

One of the principal objects of the present invention is to provide a process for producing composite bearing races with a minimum expenditure of energy and with a minimum loss of steel. Another object is to provide a process of the type stated which is suited for making races of relatively complex configuration such as those used in tapered roller bearings. A further object is to provide a process of the type stated which does not require large quantities of high alloy steel to produce the races. An additional object is to provide a process of the type stated in which the race that is produced consists of an outer shell form and an inner core, and in which the shell form is used as a mold for casting the core. Still another object is to provide composite races that are less expensive than conventional races, yet just as durable.

The present invention is embodied in a process including forming a shell form from sheet metal such that the shell form has the general external configuration of a desired bearing race. The shell form has a cavity that opens out of one of its ends and the metal of the core is introduced into the cavity where it is caused to assume a molten state. The metal is then permitted to cool and solidify. The invention also resides in the bearing races so formed and in a bearing including such races. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur—

FIG. 3 illustrates the inner ring of the cone in perspective, the ring further being partially cut away and in section;

FIG. 4 is a sectional view of the cone in the position in which its core is cast;

FIG. 5 is a sectional view of the cup in the position in which its core is cast.

FIG. 7 is a perspective view of the cone inner ring as it is roll formed.

DETAILED DESCRIPTION

Figure 1:
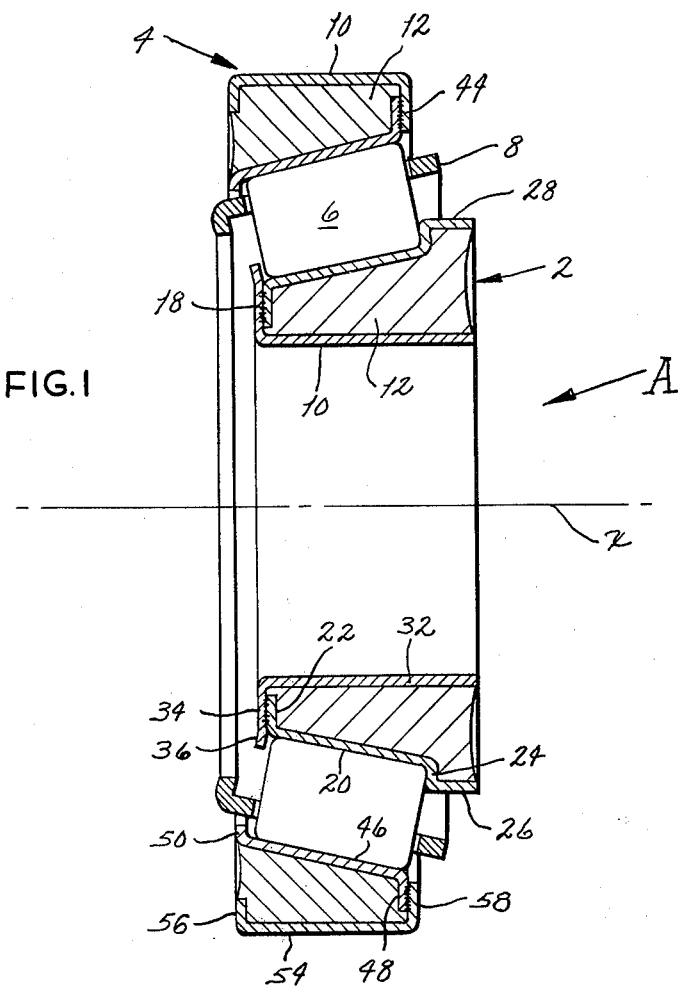
FIG. 1 is a sectional view of a tapered roller bearing provided with a composite cone and a composite cup constructed in accordance with and embodying the present invention.

Referring now to the drawings, a single row tapered roller bearing A (FIG. 1), which has races manufactured in accordance with the present invention, appears somewhat similar to a conventional single row tapered roller bearing in that it has an inner race or cone 2, an outer race or cup 4, a complement of tapered rollers 6 arranged in a single row between the cone 2 and cup 4, and a cage 8 for maintaining the proper spacing between the tapered rollers 4. The cone 2, cup 4, row of rollers 6, and cage 8 are all concentric about the axis X of rotation for the bearing A. While the cone 2 and cup 4 appear quite similar to their counterparts of a conventional tapered roller bearing, they are not, for instead of being composed of wrought steel, they are composite in nature, each having a shell form 10 made from a high quality bearing-grade steel and a core 12 formed from a less expensive, yet nevertheless extremely tough and durable steel or other suitable material. As to both the cone 2 and the cup 4, the shell form 10 extends along the surface against which the rollers 6 bear, that surface being tapered, as well as along the opposite surface which is cylindrical. It is also extends over one of the end faces, and may even extend over a portion of the opposite end face. In both the cone 2 and cup 4 the core 12 rigidifies the high alloy shell form 10, so that the cone 2 and cup 4 possess all the favorable characteristics of conventional bearing races formed entirely from wrought bearing steel.

Considering first the cone 2 (FIG. 4), its shell form 10 is composed of outer and inner rings 14 and 16 which are joined together along a weld 18. Both rings 14 and 16 are formed from high quality steel, which is preferably derived from a vacuum melt and contains the important alloying components associated with high quality bearing steel. However, instead of being manufactured from tube or bar stock, as are conventional bearing races, the rings 14 and 16 are formed from steel sheet stock having a thickness ranging between 0.050 and 0.250 inches, and preferably 0.095 inches. The steel of the sheet stock may have a high carbon content, in which case it will, upon receiving the proper heat treatment, become quite hard as is desirable for the surface areas of bearing races. On the other hand, the sheet steel may have a low carbon content, which renders it easier to form, but requires subsequent carburizing to provide a high surface hardness after heat treatment.

Figure 6:
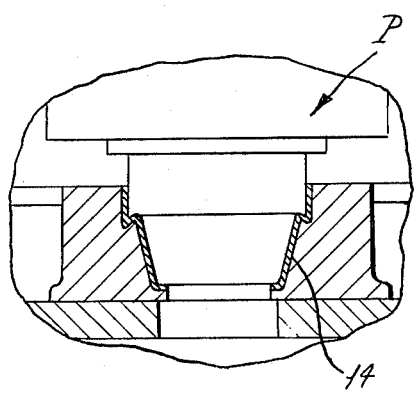
FIG. 6 is a sectional view of the cone outer ring as it is formed in a punch and die set.
Figure 2:
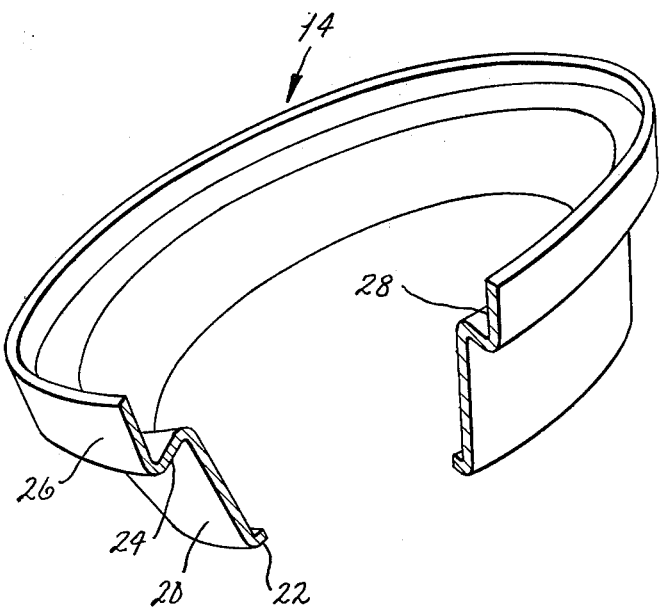
FIG. 2 illustrates the outer ring of the cone in perspective, the ring further being partially cut away and in section.

The outer ring 14 (FIGS. 2 & 4) is preferably formed in a blanking and cold forming operation (FIG. 6) so that it is homogenous throughout and has no axially directed seams. In particular, a circular disk is cut from the sheet stock in a simple blanking operation. This disk is then transferred to another punch and die set P (FIG. 6) where it is transformed into the outer ring 14. In this regard, the outer ring 14 includes (FIGS. 2 & 4) a conical raceway 20, a welding flange 22 at the small diameter end of the raceway 20, an abutment 24 at the large diameter end of the raceway 20, and a cylindrical extension 26 on the abutment 24. The welding flange 22 turns inwardly from the small end of the raceway 20 and is perpendicular to the axis X of the bearing A. The abutment 24, on the other hand, turns outwardly from the large diameter end of the raceway 20 and is generally perpendicular to the raceway 20. The cylindrical extension 26 projects rearwardly from the large end of the abutment 24, that is away from the raceway 20, and together with the abutment 24 forms a large thrust rib 28 on the cone 2.

The inner ring 16 (FIGS. 3 & 4) is preferably formed from a strip of sheet stock and then rolled into a cylindrical configuration, with the ends being brought together and joined at an axial weld 30 (FIG. 3). Then the cylindrical configuration is roll formed between rolls R (FIG. 7) to provide a cylindrical inner wall 32 and a welding flange 34 at one end of the wall 32. The welding flange 34, like the welding flange 22 of the outer ring 16, is perpendicular to the axis X of the bearing B, at least adjacent to the inner ring 16. It is, however, somewhat wider than the flange 22, and near its periphery turns slightly oblique to the axis X to provide a small retaining rib 36 on the end of the cone 2.

Once the two rings 14 and 16 are formed, they are joined together along their respective welding flanges 22 and 34 at a weld 18 (FIG. 4), which is continuous in that it extends for the full 360° of the two flanges 22 and 34. When the rings 14 and 16 are so joined, they are concentric to each other and to the axis X and create a cavity 38 that is open at one end and is closed at the other end by the overlapping flanges 22 and 34, which create an end wall on the cone 2. Moreover, the free ends of the cylindrical extension 26 for the outer ring 14 and the free and of the cylindrical wall 32 of the inner ring 16 lie in the same plane. The resulting structure is the shell form 10 for the cone 2.

The cup 4 (FIG. 5) also has two rings, that is an inner ring 40 and an outer ring 42, which are joined together along a weld 44. The inner ring 40 is preferably derived from a punch and die stamping operation, just as the outer ring 14 of the cone 2. It has a conical raceway 46, a welding flange 48 at the large diameter end of the raceway 46 and a stiffening flange 50 at the small diameter end of the raceway 46. Both flanges 48 and 50 are perpendicular to the axis X of the bearing A, with the welding flange 48 being directed outwardly and the stiffening flange 50 being directed inwardly.

The outer ring 42, like the inner ring 16 of the cone 2, is preferably derived from a strip of sheet steel that has been rolled into a cylindrical configuration, the ends of which are brought together along and are joined at an axial weld (not shown). The cylindrical configuration, which is formed, is then rolled to provide a cylindrical outer wall 54 (FIG. 5) and flanges 56 and 58 which are at the ends of the wall 54, with the latter being somewhat wider than the former. Both flanges 56 and 58 are directed inwardly and each is perpendicular to the cylindrical wall 54.

To complete the shell form 10 of the cup 4, the two rings 40 and 42 are brought together into a concentric disposition with the welding flange 58 of the outer ring 42 overlying the welding flange 48 of the inner ring 40. Then the rings 40 and 42 are joined at their flanges 48 and 58 along a weld 44 which is continuous in that it extends a full 360°. The shell form 10 which is so formed has a cavity 60 which is closed at one end by the two flanges 48 and 58 and the weld 44 that joins them and is open at its opposite end. Indeed, the flanges 48 and 58 form the end wall of the cavity 60.

In the alternative, each shell form 10, whether it be for the cone 2 or the cup 4, may be warm formed from a single disk in an isothermal pressing operation. The temperature at which this operation takes place should range between 1000° F. and 1700° F.

Preferably the cores 12 for the cone 2 and cup 4 are formed in a casting operation in which the shell forms 10 for the cone 2 and cup 4 serve as replaceable casting dies. The metal of the cores 12 should have a melting point below that of the metal for the shell forms 10 and should further have the capability of bonding to the metal of the shell forms 10 upon solidifying within the shell forms 10. If the steel of the shell forms 10 melts at 2650° F., which is typical of bearing-grade steel, then the material of the cores 12 should have a melting point of at least 200° F. but preferably 300° F. below that of the steel in the shell forms 10. While it is desirable to use a ferrous alloy for the core 10, other metals and alloys of them may also be employed. Indeed, the cores 12 need not even be metallic.

In any event, once the shell forms 10 of the cone 2 and cup 4 are completed, the core metal is heated to a molten condition, yet is maintained preferably 300° F. cooler than the melting point of the steel for the shell forms 10. The molten core metal is then introduced into the cavities 38 and 60 of the cone and cup shell forms 10, respectively, until those cavities are completely filled. Simple static filling, as with a ladle may be used, or die casting techniques may be employed. In either case, the shell forms 10 serve as replaceable molds, and contact between the molten core metal and the typical metal of die cast molds is minimized. Indeed, die casting, which is usually not used with steel, is possible and in fact very practical, because expensive molybdenum molds are not required. On the contrary, the shell forms 10 function as the molds.

Alternatively, a weighed cold slug of core metal may be inserted into the open end of the cavity 38 or 60 of the shell form 10, and then the shell form 10 and the core metal are heated to a temperature above the melting point of the core metal, but below the melting point of the shell form metal. The differential between the two melting points should be at least 300° F. The core metal of course melts and completely fills the cavity 38 or 60 in the shell form 10, conforming to the shape of the cavity 38 or 60 as it does. Thereupon, the shell form 10 and the molten core metal are cooled, and upon solidifying the core metal bonds in the nature of a weld to the shell form 10 and becomes the core 12. Preferably, the cold slug of core metal is derived by compacting powdered metal at ambiant temperature to the desired configuration while outside of the shell form 10. The slug may also be die cast apart from the shell form 10.

Irrespective of whether the core 12 is derived from a direct casting into the shell form 10 or from a slug that is melted within the shell form 10, the cone 2 or cup 4, once the core metal has solidified within its shell form 10, is reheated to a temperature above the melting point for the metal of the core 12, but below the melting point of the shell form 10. Indeed, the temperature of the reheat should be at least 300° F. below the melting point of the metal for the shell form 10. This condition is sustained long enough to again melt the core 12, whereupon the composite cone 2 or cup 4 is again cooled, and as it cools the core metal bonds more firmly to the shell form 10. In other words, the reheat enhances the bond between the shell form 10 and the core 12, permitting that bond to in effect constitute a weld or fusion bond.

If the shell form 10 is made from a low carbon steel, the cooling from the reheat should occur slowly in a carbon-rich atmosphere at least to 1300° F. During this time the low carbon steel of the shell form 10 acquires carbon and at its surface is equivalent to high carbon steel. In other words, during the cooling from the reheat, the shell form 10 is case carburized. Obviously, if the shell form 10 is made from high carbon steel, the cooling from the reheat to 1300° F. may be much more rapid, and an inert gas, such as nitrogen, or a vacuum may be substituted for the carbon-rich atmosphere.

In all cases the cooling from the reheat continues to room temperature, whereupon the cone 2 or cup 4 is again reheated, this time to a temperature suitable for hardening by quenching in oil. In the case of high carbon shell forms 10 or low carbon shell forms 10 that have been case carburized, a range of 1500° F. to 1700° F. is suitable with 1550° F. being preferred. Then the cone 2 or cup 4 is quenched in oil to acquire the desired hardness in the shell form 10 and core 12. After the oil quench, the cone 2 or cup 4 is tempered, this being achieved by heating to about 360° F. and cooling to room temperature.

Finally, the cone 2 and cup 4 are finish ground along critical surfaces of their respective shell forms 10 to provide them with the precise dimensions and geometry demanded of tapered roller bearings. More specifically, the cone 2 is ground along the raceway 20 of its shell form 10 to provide that raceway with the correct taper and diameter. It is also ground along the abutment 24 to provide it with a surface that will conform to the large diameter end faces of the tapered rollers 6. More grinding is performed along the cylindrical inner wall 32 so that the cone bore is truly cylindrical and within prescribed tolerances. The cone 2 is also ground along its backface so that the ground surfaces are square with respect to the axis X, and it may be similarly ground along its front face if that face is to be mounted next to a shoulder or spacer. Other surfaces on the cone 2 may also be ground. The cup 4, on the other hand, is ground along the raceway 46 of its shell form 10 to provide the correct taper and diameter, and also along the cylindrical outer wall 54 to provide a truly cylindrical surface that is within prescribed tolerances. The cup 4 is further ground along its front and back faces so that those ground surfaces are square with respect to the axis X. Since the bearing A is a tapered roller bearing, the grinds along the raceways 20 and 46 of the cone 2 and cup 4 are such as to place those raceways on apex, meaning that if the exposed conical surfaces of the raceways 20 and 46 were extended to their respective apexes, those apexes would lie at a common point along the axis X in the assembled bearing A.

After the cone 2 and cup 4 are completed by the finish grinding operations, the bearing A may be assembled. This involves placing the tapered rollers 6 around the raceway 20 of the cone 2 with the large diameter ends of the rollers 6 against the abutment 24. Then the cage 8 is installed over the rollers 6 by one of the conventional procedures. The cage 8 coupled with the retaining rib 36 at the small end of the cone raceway 20 maintain the rollers 6 around the cone 2 and enable the cone 2, the rollers 6, and the cage 8 to be handled as a unit. This unit, which is known as a cone assembly, is thereafter inserted axially into the cup 4 from the large end of the cup raceway 46 and is advanced until the rollers 6 seat against the raceways 20 and 46.

This invention is intended to cover all changes and modifications of the example of the invention herein chosen for purposes of the disclosure which do not constitute departures from the spirit and scope of the invention.

What is claimed is:

1. A race for an antifriction bearing, said race comprising:
    (a) a sheet metal shell form comprising two pieces of ferrous alloy material in which one piece has a cylindrical wall with one edge turned to form a flange and the other piece has a conically shaped wall forming a raceway surface with large diameter and small diameter ends, said other piece being formed with a turned edge to form a flange at that edge, the two pieces being joined together at said turned edges with said flanges in fixed abutment such that said cylindrical wall and conically shaped wall are spaced apart to provide a cavity therebetween which is closed at one side by said abutted flanges; and
    (b) a core located within the cavity of the shell form to rigidify the shell form, the core being a ferrous alloy that is different from the alloy of the shell form and being bonded to the spaced apart walls and the end wall of the shell form.

2. The race according to claim 1 wherein the one piece having the cylindrical wall lies inside the other piece having the conically shaped wall and the flange on the one turned edge of the cylindrical wall projects radially outwardly beyond the flange on said other piece to provide a retaining rib for the raceway surface.

3. The race according to claim 2 wherein the one piece having the raceway thereon is a stamping that is continuous and homogenous throughout.

4. The race according to claim 3 wherein the one piece having the cylindrical wall contains an axially directed weld.

5. The race according to claim 3 wherein the wall having the raceway thereon is ground along the raceway.

6. The race according to claim 1 wherein the raceway surface on said other piece is presented outwardly, and the wall on which the raceway is located is configured to include an abutment which projects outwardly from the raceway surface adjacent the large diameter end of the raceway and also a cylindrical extension which projects axially away from said abutment.

7. A race for an antifriction bearing, wherein said race comprises:
   (a) a shell form formed from sheet metal of a ferrous alloy, the shell form having spaced apart walls and an end wall joining the two spaced apart walls at one end of the race so as to enclose a cavity, the other end of the shell form being open, one of the walls forming a raceway along which rolling elements roll, the raceway being tapered and presented inwardly, the raceway having a large diameter and a small diameter end, and the wall on which the raceway is located includes a stiffening flange which is directed inwardly at the small diameter end of the raceway; and
   (b) a core located within the cavity and introduced through the open end of the shell form to rigidify the shell form, the core being a ferrous alloy that is different from the alloy of the shell form and being bonded to the spaced apart walls and the end wall of the shell form.

8. A tapered roller bearing comprising a cone, a cup surrounding the cone, and a row of tapered rollers between the cup and the cone, the cone and the cup each including a shell form having a cylindrical wall, a tapered wall, and an end wall which together define a cavity opening outwardly opposite the end wall, and a core that occupies the cavity and rigidifies the shell form, the shell form and the core being different materials, the tapered walls of the shell forms for the cup and cone conforming to the taper of the tapered rollers and forming raceways along which the tapered rollers roll and the core being a body inserted into the cavity in a heated state and bonded to the shell forms by cooling.

9. A tapered roller bearing comprising:
   (a) a cone, a cup surrounding the cone, and a row of tapered rollers between the cup and the cone, the rollers having large and small diameter ends, the cone and the cup each including a shell form having a cylindrical wall, a tapered wall, and an end wall which together define a cavity open at one end, the tapered walls of the shell forms for the cup and cone are configured to conform to the taper of the tapered rollers to form raceways having large and small diameter ends along which the tapered rollers roll, the tapered walls along which the raceways of the cup and cone are located are continuous and homogenous in the circumferential direction, the tapered wall of the cone having a retaining element at the small diameter of the raceway and an abutment at the large diameter end of the raceway on that wall and a cylindrical extension projecting away from the abutment, and wherein the large diameter ends of the rollers are at the abutment, the tapered wall for the cup having an inwardly directed stiffening flange at the small diameter end of the raceway on that wall and wherein the small diameter ends of the rollers are located opposite to the retaining element; and
   (b) a core that occupies the cavity and rigidifies the shell form, the shell form and the core being different materials, and the core being introduced through the open end of the cavity.

* * * * *